(12) United States Patent  
Saito

(10) Patent No.: US 7,827,220 B2  
(45) Date of Patent: Nov. 2, 2010

(54) IMAGE LOG RECORDING SYSTEM, CONTROL METHOD THEREFOR, AND STORAGE MEDIUM STORING A CONTROL PROGRAM THEREFOR, THAT STORE IMAGE LOGS AND CONTROL TRANSFER SETTINGS FOR TRANSMITTING IMAGE LOGS TO AN IMAGE PROCESSING SERVER

(75) Inventor: Shigemi Saito, Kawasaki (JP)

(73) Assignee: Canon Kabushiki Kaisha (JP)

( * ) Notice: Subject to any disclaimer, the term of this patent is extended or adjusted under 35 U.S.C. 154(b) by 361 days.

(21) Appl. No.: 11/952,327

(22) Filed: Dec. 7, 2007

(65) Prior Publication Data

US 2008/0140675 A1 Jun. 12, 2008

(30) Foreign Application Priority Data

Dec. 8, 2006 (JP) .............................. 2006-332406

(51) Int. Cl.  
*G06F 17/30* (2006.01)
(52) U.S. Cl. .................... 707/915; 709/203; 709/219
(58) Field of Classification Search ............ 707/999.01, 707/999.107, 915; 709/203, 219  
See application file for complete search history.

(56) References Cited

U.S. PATENT DOCUMENTS 6,718,378 B1* 4/2004 Machida .................... 709/223
7,412,498 B2* 8/2008 Machida .................... 709/220
7,613,404 B2* 11/2009 Takeuchi et al. ............... 399/8
2004/0205169 A1* 10/2004 Machida .................... 709/220
2005/0055641 A1* 3/2005 Machida .................... 715/734
2006/0077435 A1* 4/2006 Lovat et al. ................ 358/1.15

FOREIGN PATENT DOCUMENTS

JP 2000-172720 A 6/2000

* cited by examiner

*Primary Examiner*—Leslie Wong  
(74) *Attorney, Agent, or Firm*—Rossi, Kimms & McDowell LLP

(57) ABSTRACT

An image log recording system which is capable of optimizing image log transfer. A plurality of log recording agents generate image logs. An image processing server performs image processing on the image logs transferred from the log recording agents. The image logs subjected to image processing by the image processing server are cumulatively stored in a database. Each of the image recording agents receives from a management server transfer settings for transferring an image log to the image processing server, and transfers an image log to the image processing server according to the transfer settings. The management server monitors load on the image log recording system and changes the transfer settings based on the monitored system load.

12 Claims, 11 Drawing Sheets

FIG.2

| ID 201 | IP ADDRESS 202 | TRANSFER SCHEDULE 203 | RECORDING FORM 204 | TOTAL CAPACITY (MB) 205 | USED CAPACITY (MB) 206 | PER-DAY USED CAPACITY (MB) 207 | PRIORITY 208 | LOG COUNT (PAGES) 209 |
|---|---|---|---|---|---|---|---|---|
| 1 | 192.168.0.1 | 0:00~ | TEXT | 1024 | 100 | 50 | 2 | 2000 |
| 2 | 192.168.0.2 | 1:00~ | IMAGE(300dpi) | 10240 | 6000 | 2000 | 1 | 6000 |
| 3 | 192.168.0.3 | 3:00~ | IMAGE(100dpi) | 5120 | 2000 | 500 | 4 | 8000 |

FIG.3

| | RECORDING FORM | AGENT TOTAL LOG COUNT (PAGES) L | IMAGE PROCESSING -AWAITING LOG COUNT (PAGES) M | DB REGISTRATION -AWAITING LOG COUNT (PAGES) N | IMAGE PROCESSING -AWAITING LOG SIZE (KB/PAGE) S | DB REGISTRATION -AWAITING LOG SIZE (KB/PAGE) T |
|---|---|---|---|---|---|---|
| 301 | IMAGE | 25000 | 3000 | 3500 | 1000 | 250 |
| | TEXT | 84000 | 40000 | 10000 | 5 | 5 |

| | RECEPTION CAPABILITY (PAGE/HOUR) P | IMAGE PROCESSING CAPABILITY (PAGE/HOUR) Q | DB REGISTRATION CAPABILITY (PAGE/HOUR) R | CAPACITY OF IMAGE PROCESSING SERVER (GB) | | DB CAPACITY (GB) | |
|---|---|---|---|---|---|---|---|
| | | | | USED CAPACITY A | TOTAL CAPACITY B | USED CAPACITY C | TOTAL CAPACITY D |
| | 4100 | 1000 | 2900 | 4 | 36 | 640 | 1280 |
| | 13400 | 58000 | 5400 | | | | |

IMAGE LOG RECORDING SYSTEM, CONTROL METHOD THEREFOR, AND STORAGE MEDIUM STORING A CONTROL PROGRAM THEREFOR, THAT STORE IMAGE LOGS AND CONTROL TRANSFER SETTINGS FOR TRANSMITTING IMAGE LOGS TO AN IMAGE PROCESSING SERVER

BACKGROUND OF THE INVENTION

1. Field of the Invention

The present invention relates to an image log recording system for recording job attributes including a user who executes a job by a digital multi-function machine or a printer and a date and time of the job execution in association with an image, a control method therefor, and a storage medium storing a control program for executing the control method, and more particularly to an image log recording system characterized by an image log collecting technique, a control method therefor, and a storage medium storing a control program for executing the control method.

2. Description of the Related Art

Recently, with widespread use of printers and digital multi-function machines, it has become easier to perform printing, copying, and transmission of originals. This has improved the userfriendliness of the apparatuses, but at the same time, a new problem has occurred that printing, copying, or transmission of confidential documents can cause information leakage.

To prevent this information leakage, there has been proposed an image log recording system in which all pieces of image data are stored in a storage device when printing, copying, facsimile transmission, or e-mail transmission is performed (see e.g. Japanese Laid-Open Patent Publication No. 2000-172720). With the proposed system, it is possible to check the stored image log when information leakage occurs, to thereby track which printer or digital multi-function machine output the data, and when, where and how the data was output.

A description will be given of an example of the configuration of the above-mentioned image log recording system.

The image log recording system is comprised of digital multi-function machines and print servers for primarily recording image logs, and a database for collecting and storing image logs, and an image processing server disposed between the digital multi-function machines and the print servers, and the database, as required.

In each digital multi-function machine or print server, when a job, such as printing, copying, facsimile transmission, or e-mail transmission, is executed, an image as the processed contents of the job is recorded together with job attributes including a job executor, execution date and time, and an execution device.

The recorded image and the job attributes (hereinafter referred to as "the image log") are transferred to the image processing server at a time scheduled by an administrator in a manner asynchronous to the execution of the job, and are deleted from the digital multi-function machine or the print server upon completion of the transfer. When receiving the image log, the image processing server performs OCR processing and conversion of the image into a format suitable for storage, as required, and then transfers the image log to the database. These processes are executed asynchronously. The database cumulatively stores image logs.

Further, the digital multi-functions machine and the print servers are each capable of monitoring an HDD thereof and transferring an image log to the image processing server, regardless of a schedule, when the capacity of an area available for image log recording becomes smaller than a predetermined value.

However, the number of jobs to be executed in the digital multi-function machines and the print servers is not constant, and hence when numerous jobs are executed within a short time, numerous image logs are cumulatively stored in the image processing server, which can make it impossible for the image processing server to receive more image logs.

In addition, since the conventional image processing server is configured to receive all image logs transferred by the digital multi-function machines and the print servers, the recording area of the image processing server becomes short, which makes it impossible to receive the image processing server. As a result, numerous image logs can be left stored in some digital multi-function machines and print servers.

For this reason, if a digital multi-function machine or a print server continues job execution, no more image logs can be recorded, and therefore the digital multi-function machine or the print server has no choice but to permit a job to be executed without log recording or to inhibit execution of the job.

SUMMARY OF THE INVENTION

The present invention provides an image log recording system which is capable of optimizing image log transfer, a control method therefor, and a storage medium storing a control program for executing the control method.

In a first aspect of the present invention, there is provided an image log recording system comprising an image recording unit configured to generate an image log, an image processing server configured to perform image processing on image logs transferred from the image recording unit, a database configured to cumulatively store the image logs subjected to image processing by the image processing server, and a transfer management server, wherein the image recording unit comprises a transfer settings-receiving unit configured to receive from the transfer management server, transfer settings for transferring an image log to the image processing server, and an image log transfer unit configured to transfer the image log to the image processing server according to the transfer settings, and the transfer management server comprises a transfer settings-notifying unit configured to notify the image recording unit of the transfer settings, a load monitoring unit configured to monitor load on the image log recording system, and a transfer settings-changing unit configured to change the transfer settings based on the system load monitored by the load monitoring unit.

According to the first aspect of the present invention, it is possible to optimize image log transfer to thereby avoid a problem that untransferred or unprocessed image logs are cumulatively stored in some of the digital machines and the print drivers or in the image processing server, causing omission of recording of image logs or inhibition of job execution.

The load monitoring unit can monitor at least one of a reception capability, a storage capability, an image processing capability, a database registration capability, a reception amount, a storage amount, and an image processing amount, and a database registration amount of the image processing server.

The image recording unit comprises a per-unit time recording amount-recording unit configured to record a per-unit time recording amount, a per-unit time recording amount-notifying unit configured to notify the transfer management server of the recorded per-unit time recording amount, and a recordable amount-notifying unit configured to notify the transfer management server of a currently recordable amount, and the transfer management server comprises an image recording unit recording amount-recording unit configured to receive and record the per-unit time recording amount and the recordable amount transmitted from the image recording unit, and the transfer settings-changing unit determines the transfer settings for transfer from the image recording unit, based on the per-unit time recording amount and the recordable amount of the image recording unit.

The transfer settings-changing unit determines the transfer settings further based on at least one of a priority, a transfer capability, and a recording form of the image recording unit, which are set or measured in advance.

The transfer management server comprises a transfer permission setting-notifying unit configured to notify the image processing server of the transfer settings in place of the transfer settings-notifying unit, and the image processing server comprises a transfer permission setting-receiving unit configured to receive a transfer permission setting, and an image log reception-permitting unit configured to determine, based on the received transfer permission setting, whether or not image log transfer from the image recording unit is to be enabled, and permit image log reception only when it is determined that the image log transfer is to be enabled.

The transfer management server comprises a high load notification unit configured to be operable when a high load is detected by the load monitoring unit, to notify the high load to an administrator.

The image recording unit can be implemented by any of a digital multi-function machine, a printer, a print server, and a computer which generates print jobs.

Two or more of the image processing server, the database, and the transfer management server can be formed by an identical server.

The recordable amount-notifying unit notifies the transfer management server of a recordable amount with respect to a predetermined capacity.

The image log recording system comprises a recording amount change-recording unit configured to record a change in a recording amount measured over a predetermined time period, and the per-unit time recording amount-notifying unit performs per-unit time recording amount notification based on the change in the recording amount.

The image log recording system comprises a recording amount change input unit configured to accept input of an estimated recording amount change from a user.

In a second aspect of the present invention, there is provided a control method for an image log recording system including an image recording unit configured to generate an image log, an image processing server configured to perform image processing on image logs transferred from the image recording unit, a database configured to cumulatively store the image logs subjected to image processing by the image processing server, and a transfer management server, comprising a transfer settings-receiving step of receiving from the transfer management server, transfer settings for transferring an image log to the image processing server, an image log transfer step of transferring an image log to the image processing server according to the transfer settings, the transfer settings-receiving step and the image log transfer step being executed by the image log recording unit, a transfer settings-notifying step of notifying the image recording unit of the transfer settings, a load monitoring step of monitoring load on the image log recording system, and a transfer settings-changing step of changing the transfer settings based on the system load monitored in the load monitoring step, the transfer settings-notifying step, the load monitoring step, and the transfer settings-changing step being executed by the transfer management server.

In a third aspect of the present invention, there is provided a computer-readable storage medium storing a control program for causing computers to perform a control method for an image log recording system including an image recording unit configured to generate an image log, an image processing server configured to perform image processing on image logs transferred from the image recording unit, a database configured to cumulatively store the image logs subjected to image processing by the image processing server, and a transfer management server, wherein the control program comprises a transfer settings-receiving module for causing the image log recording unit to receive from the transfer management server, transfer settings for transferring an image log to the image processing server, an image log transfer module for causing the image log recording unit to transfer the image log to the image processing server according to the transfer settings, a transfer settings notification module for causing the transfer management server to notify the image recording unit of the transfer settings, a load monitoring module for causing the transfer management server to monitor load on the image log recording system, and a transfer settings-changing module for causing the transfer management server to change the transfer settings based on the system load monitored by the load monitoring module.

The features and advantages of the invention will become more apparent from the following detailed description taken in conjunction with the accompanying drawings.

BRIEF DESCRIPTION OF THE DRAWINGS

FIG. 2 is a diagram showing information on log recording agents managed in a management server appearing in FIG. 1.

FIG. 3 is a diagram showing information on an image processing server and a database managed in the management server appearing in FIG. 1.

DETAILED DESCRIPTION OF THE PREFERRED EMBODIMENTS

The present invention will now be described in detail with reference to the drawings showing a preferred embodiment thereof.

Figure 1:
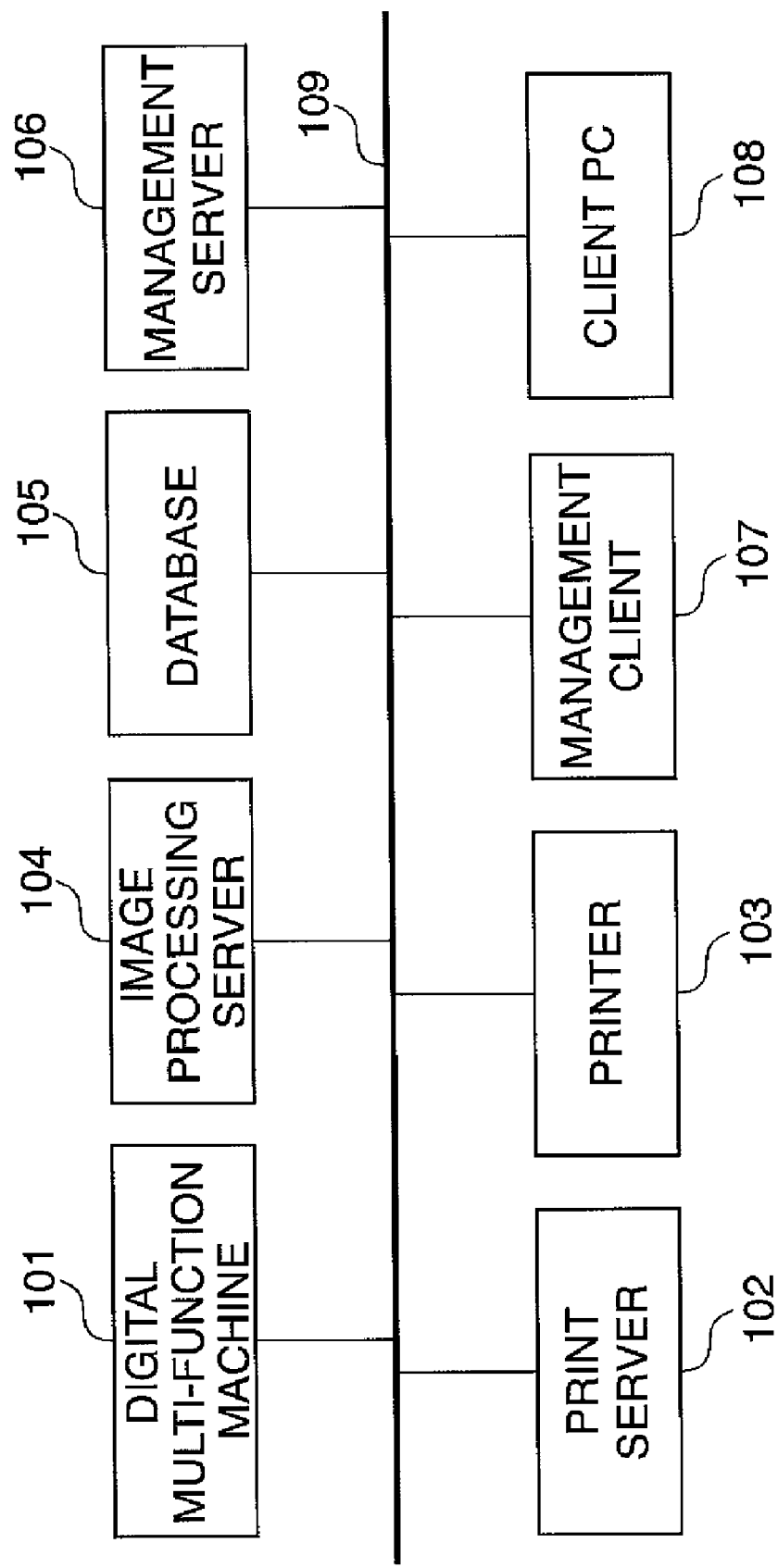
FIG. 1 is a block diagram of an image log recording system according to an embodiment of the present invention.

FIG. 1 is a block diagram of an image log recording system according to the embodiment of the present invention.

As shown in FIG. 1, the image log recording system is constructed by interconnecting a digital multi-function machine 101, a print server 102, a printer 103, an image processing server 104, a database 105, a management server 106, a management client 107, and a client PC 108, on a network 109.

The digital multi-function machine 101 is equipped with a scan function, a print function, a copy function, an e-mail function, a facsimile function, and/or like other functions. The digital multi-function machine 101 generates data (which will be hereinafter referred to as log image data) of an electronic image used in a job executed by one of the above-mentioned functions, and records the log image data together with job history information (hereinafter referred to as "a job log") including information on a job executor, execution date and time, and the digital multi-function machine operated for the job. It should be noted that, as described hereinafter, text data obtained by performing character recognition processing, such as OCR processing, on image data used in a job, and text data extracted from PDL data in a print job (hereinafter both referred to as "log text data) may be recorded together with a job log. Data including log image data and a job log, or data including log text data and a job log is referred to as an image log. The recorded image log is transferred to the image processing server 104 at the scheduled time.

The print server 102 records character strings extracted from electronic image data for a print job issued from the client PC 108 to the printer 103 connected to the print server 102, or ones extracted from PDL data in a print job. At this time, the character strings are associated with a job log including information on a job executor, execution date and time, and the printer operated for the job, and are recorded as an image log. The print server 102 transfers the image log to the image processing server 104 at a scheduled time.

The function of each of the digital multi-function machine 101 and the print server 102, for transferring image logs to the image processing server 104, is hereinafter referred to as a log recording agent or simply as an agent.

The image processing sever 104 performs OCR processing on an image log containing no character strings, such as an image log transferred particularly from the digital multi-function machine, to thereby extract text information (text data).

Thereafter, the text data is converted into a format suitable for storage in the database 105 and is registered in the same. Further, the received attributes are registered in association with the image (data). The OCR processing and the conversion of the text data into a format suitable for storage in the database are hereinafter referred to as image processing.

Image data and associated text data and attributes sent from the image processing server 104 are cumulatively stored in the database 105.

The management server 106 records and manages information on the configuration of forms of image logs to be recorded in the digital multi-function machine 101 and the print server 102, transfer schedules for log transfer to the image processing server 104, and an image converting method employed by the image processing server 104.

When the configuration is changed, the management server 106 notifies the digital multi-function machine 101, the print server 102, and the image processing server 104 of the changed i.e. new configuration. This notification may be performed when the management server 106 receives an inquiry as to configuration from the digital multi-function machine 101, the print server 102, or the image processing server 104.

The management client 107 is a terminal apparatus used by an administrator of the present image log recording system so as to configure settings of the management server 106, or browse or retrieve image logs stored in the database 105. The management client 107 is implemented by a general PC.

The client PC 108 issues print jobs to the printer 103. When the client PC 108 issues a print job to the printer 103, a printer driver, not shown, installed in the client PC 108 transmits electronic image data of the print job and character strings extracted from PDL data in the print job to the print server 102 as well. Further, a job log including attribute information on the print job and information identifying a user who issued the print job is sent to the print server 102.

Although in FIG. 1, the component elements 101 to 108 are included in the system, one for each kind, the system may include a plurality of component elements per kind. In particular, a plurality of digital multi-function machines 101, print servers 102, and printers 103 are often included in the system. The image processing server 104 may have a redundant configuration mainly for load dispersion, and the database 105 and the management server 106 may have a redundant configuration so as to enhance reliability.

Further, a component element and another component element may be provided within the same server. For example, the management server 106 and the image processing server 104 may be integrally provided in one identical server.

FIG. 2 is a diagram showing information on log recording agents managed in the management server appearing in FIG. 1.

As shown in FIG. 2, the information includes IDs 201 uniquely assigned to respective log recording agents, IP addresses 202 of the respective log recording agents, and schedules according to which the respective associated log recording agents are to transfer recorded image logs to the image processing server 104.

Further, the information includes a recording form 204 of a non-job log portion of each image log to be recorded when an associated job is executed by a log recording agent. Normally, a form of an image (format of log image data) is recorded. It should be noted that the administrator can change the resolution of the log image data. Further, if it is desired to suppress an increase in the storage capacity or load on a communication line, the log may be recorded in a text form (as log text data) instead of being stored as image data. In a case where the log recording agent is configured such that the text form is employed for recording the non-job log portion of an image log, the print server extracts character strings from a PDL command, and the digital multi-function machine performs OCR processing on image data handled in an executed job to thereby extract character strings therefrom.

Furthermore, the information includes a total capacity 205 of each log recording agent for recording image logs. A portion of a recording area in an HDD, a SRAM, a memory, or the like of each log recording agent is allocated to the capacity of image log recording. The currently used capacity 206 of the image log recording area of each log recording agent is also included in the information.

Moreover, the information includes a capacity 207 of the image log recording area of each log recording agent, which is consumed or used per day (hereinafter referred to as "per-day capacity"). The per-day capacity 207 is represented by an average value of per-day capacity values obtained within a recent predetermined period e.g. of ten days. The information also includes priorities 208. Each priority 208 indicates the importance of a job executed by the digital multi-function machine 101 or the print server 102. In addition, the information includes a page count 209 of each image log recorded in an associated log recording agent.

The above-described information items are collected and set as follows.

First, a log recording agent is registered in the management server 106. The method of registration includes a method in which the log recording agent notifies itself to the management server 106 and a method in which the administrator registers the log recording agent in the management server 106 via the management client 107.

When the log recording agent is to notify itself to the management server 106, the log recording agent notifies the management server 106 of its own IP address 202 and the total capacity 205 of its own image log recording area. After checking that the log recording agent has not been registered yet, the management server 106 issues a unique ID 201 and records the same in association with the IP address 202 and the total capacity 205.

When the administrator is to register a log recording agent in the management server 106, the administrator sets an IP address 202. After checking that the log recording agent has not been registered yet, the administrator confirms that the log recording agent is present on the IP address, and acquires the total capacity 205 of the image log recording area of the log recording agent. Then, the administrator issues a unique ID 201 and records the same in association with the IP address 202 and the total capacity 205.

Thereafter, the administrator sets a transfer schedule 203, a recording form 204, and a priority 208 for each log recording agent, using the management client 107. Then, these values are recorded on the management server 106 in association with the associated ID 201, and are sent to the log recording agent associated with the ID 201 at the same time. The administrator can reconfigure these values.

The management server 106 inquires of the log recording agent as to a used capacity of the log recording area and an image log count, and records received values as the used capacity 206 and the associated log count 209 of the log recording agent.

FIG. 3 is a diagram showing information on the image processing server and the database managed in the management server appearing in FIG. 1.

As shown in FIG. 3, the information includes a total log count 301 indicative of the total number of image logs recorded in each log recording agent managed by the management server 106. A value recorded as each total log count 301 indicates the number of pages. Further, the information includes an image log count 302 indicative of the number of image logs awaiting image processing in the image processing server 104 managed by the management server 106. A value recorded as each image log count 302 also indicates the number of pages.

The information also includes an image log count 303 indicative of the number of image logs already subjected to image processing by the image processing server 104 and awaiting registration in the database 105. A value recorded as the image log count 302 indicates the number of pages. Further, the information includes an image file size 304 indicative of a file size per one page of image logs awaiting image processing by the image processing server 104 managed by the management server 106. A value recorded as the file size 304 is in KB.

Further, the information includes a file size 305 indicative of a file size per one page of image logs already subjected to image processing by the image processing server 104 and awaiting registration in the database 105. A value recorded as each file size 305 is in KB.

Further, the information includes reception capability 306 indicative of the number of image log pages that can be received per hour. The reception capability is represented by a value obtained by dividing the number of pages received over a recent predetermined period e.g. of ten days by hours required for receiving the image logs.

Furthermore, the information includes an image processing capability 307 indicative of the number of image log pages that can be processed per hour. The image processing capability is represented by a value obtained by dividing the number of pages processed over a recent predetermined period e.g. of ten days by hours required for processing the image logs.

The information also includes a DB registration capability 308 indicative of the number of image log pages that can be registered per hour. The DB registration capability is represented by a value obtained by dividing the number of pages registered over a recent predetermined period e.g. of ten days by hours required for registering the image logs.

The information items 301 to 308 are recorded on a recording form basis, i.e. in a manner classified according to the recording form of image logs.

The information in FIG. 3 further includes a used capacity 309 of a recording area in the image processing server 104 managed by the management server 106, which can record image logs awaiting image processing, intermediate data currently undergoing image processing, and image logs awaiting registration in the database, and a total capacity 310 of the recording area.

Furthermore, the information includes a used capacity 311 of a recording area in the database 105 managed by the management server 105, which can record registered image logs, and a total capacity 312 of the recording area.

The values of the respective information items 301 to 312 are obtained in an image log collecting process described hereinafter with reference to FIG. 5.

Figure 4:
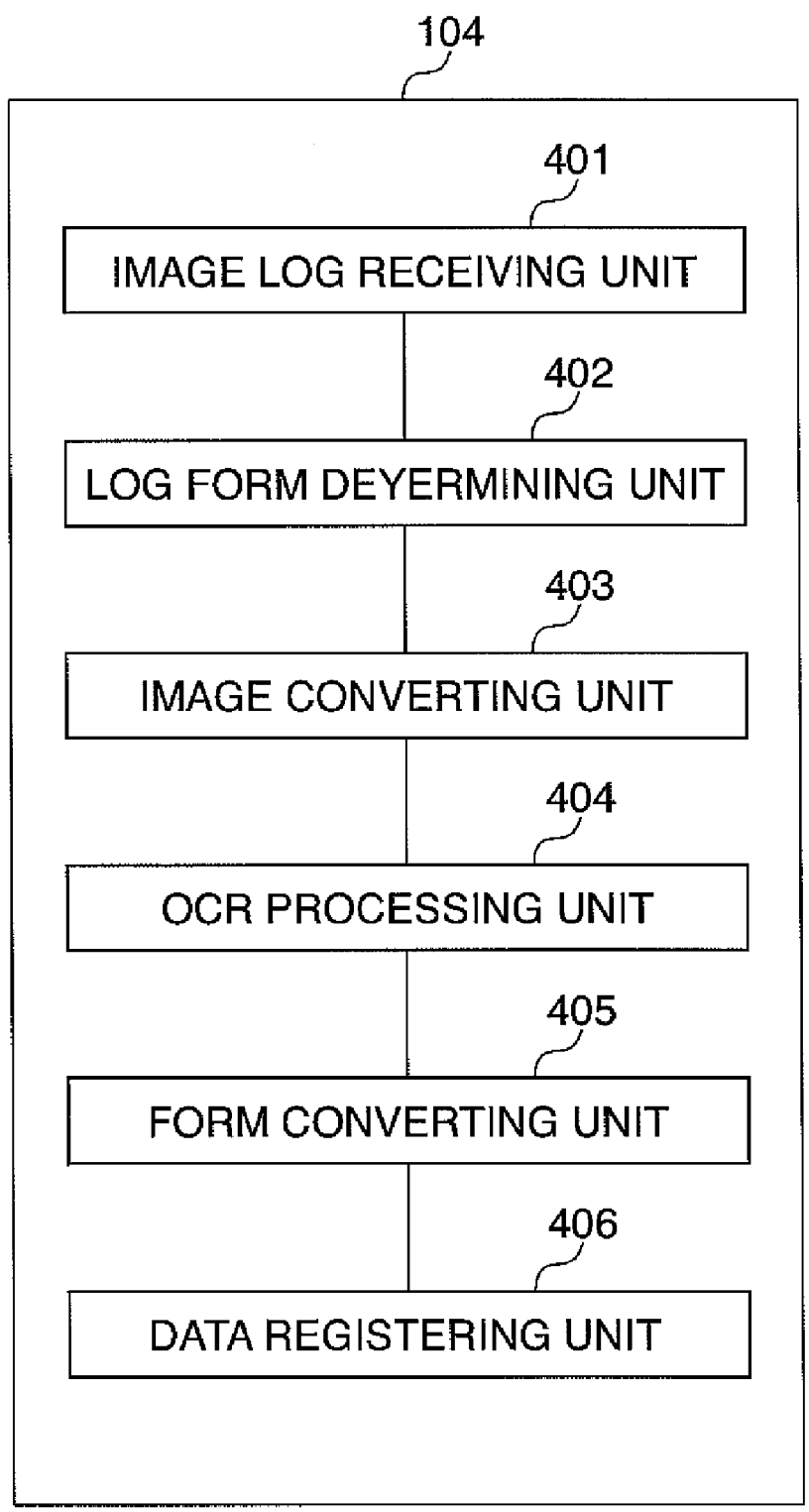
FIG. 4 is a block diagram of processing units arranged in the image processing server appearing in FIG. 1.

FIG. 4 is a block diagram of processing units arranged in the image processing server appearing in FIG. 1.

As shown in FIG. 4, the image processing server 104 is comprised of component elements designated by reference numerals 401 to 406.

The image log receiving unit 401 receives an image log from each agent operating e.g. on the digital multi-function machine 101 or the print server 102. The log form determining unit 402 checks the form of the received image log and determines a flow of processing according to the form of the log.

When the log form determining unit 402 determines that OCR processing is to be performed, the image converting unit 403 converts the image log into a form on which OCR processing can be performed. The OCR processing unit 404 performs OCR processing on the image log, and extracted text data is associated with the image log.

The form converting unit 405 converts the image log into a form suitable for storage in the database. This processing may include converting the image log such that the resolution thereof is changed into a value set by the system administrator. A data registering unit 406 registers the processed image log and the text data in the database 105.

In the present embodiment, the management server 106 controls a process for collecting image logs from the log recording agents and storing these in the image processing server 104. The basic flow of the process will be described with reference to FIG. 5.

Figure 5:
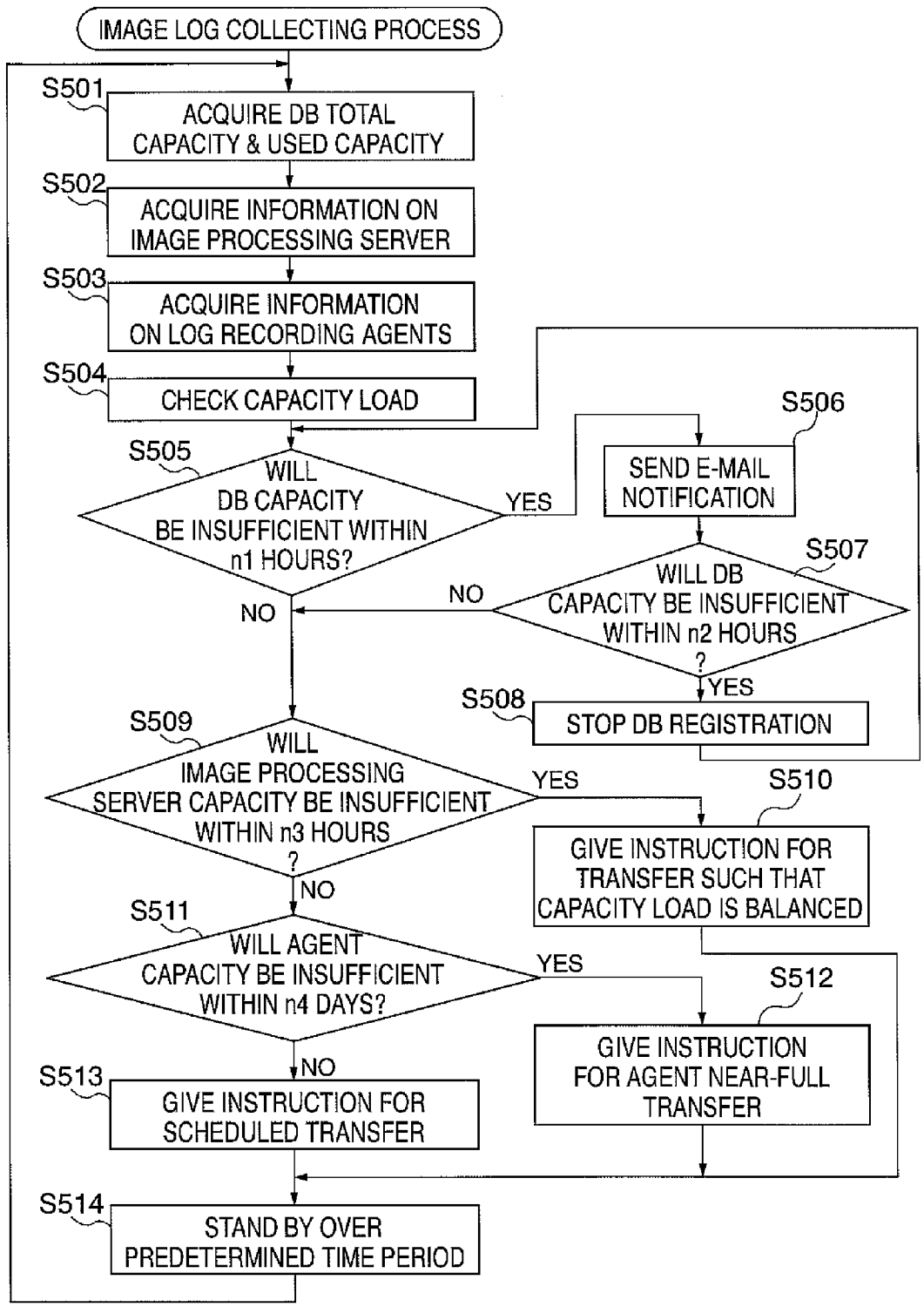
FIG. 5 is a flowchart of an image log collecting process executed by the image processing server.

FIG. 5 is a flowchart of the image log collecting process executed by the image processing server appearing in FIG. 1.

Referring to FIG. 5, first, in a step S501, the management server 106 inquires of the database 105 as to the total capacity and currently used capacity of its image log recording area and acquires information on these. In a step S502, the management server 106 inquires of the image processing server 104 as to the total capacity and currently used capacity of its image log recording area and acquires information on these.

In a step S503, the management server 106 inquires of the digital multi-function machine 101 and the print server 102 as log recording agents as to the total capacity and currently used capacity of the image log recording area of each of the log recording agents and acquires information on these.

In a step S504, the management server 106 checks the load status of the image log recording system. In this step, a future change in the image log recording area of each of the database 105, the image processing server 104, and the log recording agents is calculated. This calculation is performed as follows:

A value of the log count 301 of image logs recorded in the log recording agents at the time point of the calculation is represented by L0, and a value which the log count 301 is estimated to take at a time point of n hours thereafter is by Ln. Further, a value of the image log count 302 of image logs awaiting image processing recorded in the image processing server 104 at the time point of the calculation is represented by M0. A value which the image log count 302 is estimated to take at the time point of n hours thereafter is represented by Mn.

A value of the image log count 303 of image logs subjected to the image processing and awaiting database registration in the image processing server 104 at a time point of the calculation is represented by N0. A value which the image log count 303 is estimated to take at the time point of n hours thereafter is represented by Nn.

The average size of the image logs awaiting image processing at the time point of the calculation is represented by S, and the average size of the image logs awaiting registration in the database at the time point of the calculation is by T. The number of image log pages that can be received by the image processing server 104 per hour is represented by P, and the number of image log pages that can be processed by the image processing server 104 per hour is by Q.

Further, the number of image log pages that can be registered in the database 105 per hour by the image processing server 104 is represented by R. A value of the used capacity 309 of the image log recording area of the image processing server 104 used thereby at the time point of the calculation is represented by A0, and a value which the used capacity 309 is estimated to take at the time point of n hours after the calculation is by An.

The total capacity 310 of the image log recording area of the image processing server 104 is represented by B. A value of the used capacity 311 of the image log recording area used by the database 105 at the time point of the calculation is by C0. A value which the used capacity 311 is estimated to take at the time point of n hours thereafter is represented by Cn. The total capacity 312 of the image log recording area of the database 105 is represented by D.

Values of the log counts and the used capacities of log recording areas taken at the time point of n hours later are calculated using the following equations:

$$Ln+1 = Ln - P$$

$$Mn+1 = Mn + Min\ (Ln, P) - Min\ (Mn, Q)$$

$$Nn+1 = Nn + Min\ (Mn, Q) - Min\ (Nn, R)$$

$$An = Mn \cdot S + Nn \cdot T$$

$$Cn+1 = Cn + Min\ (Nn, R)$$

In a step S505, it is determined whether or not the recording area of the database 105 will become insufficient within a predetermined time period of n1 hours. This determination is made by determining whether Cn>D (n≦n1) holds. If it is determined that the area will become insufficient, the process proceeds to a step S506, whereas if not, the process proceeds to a step S509.

In the step S506, the management server 106 notifies a warning to the administrator. The warning is sent e.g. by e-mail. In a step S507, a determination is made again as to the future capacity of the database 105. In this step, it is determined whether or not the recording area of the database 105 will become insufficient within a predetermined time period of n2 hours, by determining whether Cn>D (n≦n2) holds. If it is determined that the area will become insufficient, the process proceeds to a step S508, whereas if not, the process proceeds to the step S509.

When the capacity of the database 105 is very insufficient, registration of image logs in the database 105 is stopped in the step S508, and then the per-hour page count R indicative of the number of image log pages that can be registered in the database 105 per hour by the image processing server 104 is replaced by 0. Then, the calculation in the step S505 is carried out again.

In the step S509, it is determined whether or not the recording area of the image processing server 104 will become insufficient within a predetermined time period of n3 hours. This determination is made by determining whether An>B (n≦n3) holds. If it is determined that the area will become insufficient, the process proceeds to a step S510, whereas if not, the process proceeds to a step S511.

The step S510 is executed only when the recording area of the image processing server is running short. In this case, transfer is performed, regardless of transfer schedules configured specifically for the respective log recording agents, such that capacity load is balanced between the log recording agents.

More specifically, a value of n is calculated from used capacity 206+per-day capacity 207·n+f (priority 208)>total capacity 205 for each of the log recording agents, and an agent for which the smallest n value is calculated is instructed to perform image log transfer. The value f (priority 208) is a weight determined based on the priority of a log recording agent. In the step S510, the instruction for log transfer may be given to not a single apparatus, but a plurality of apparatuses in increasing order of the n value. Then, the process proceeds to a step S514.

In the step S511, it is determined whether or not the recording areas of the log recording agents will become insufficient within a predetermined time period of n4 days. This determination is made for each of the log recording agents. In actual calculation, it is determined whether or not used capacity 206+per-day capacity 207·n>total capacity 205 (n≦n4) holds. If it is determined that the recording areas of the log recording agents will become insufficient, the process proceeds to a step S512, whereas if not, the process proceeds to a step S513.

In the step S512, the management server 106 instructs a log recording agent whose recording area is expected to be insufficient to perform image log transfer. Then, the process proceeds to the step S514.

In the step S513, the management server 106 checks the current time and compares the current time with a transfer schedule of each log recording agent. When the scheduled time of a log recording agent has arrived, the management server 106 instructs the log recording agent to perform image log transfer.

In the step S514, the management server 106 waits over a predetermined time period, and then the process returns to the step S501. The states of the database 105, the image processing server 104, and the agents change with the lapse of time. The process in FIG. 5 is executed in predetermined timing or at predetermined time intervals to thereby control the image log transfer optimally in accordance with a change in the load of the system.

In the present embodiment, the log recording agent operates on the digital multi-function machine 101 or the print server 102. The log recording agent carries out, in parallel, a process for recording an image log during execution of a job, a process for transmitting information in response to an information acquisition instruction from the management server 106, and a process for performing image log transfer in response to a transfer instruction from the management server 106. The basic flows of the respective processes will be described with reference to FIGS. 6 to 8.

Figure 6:
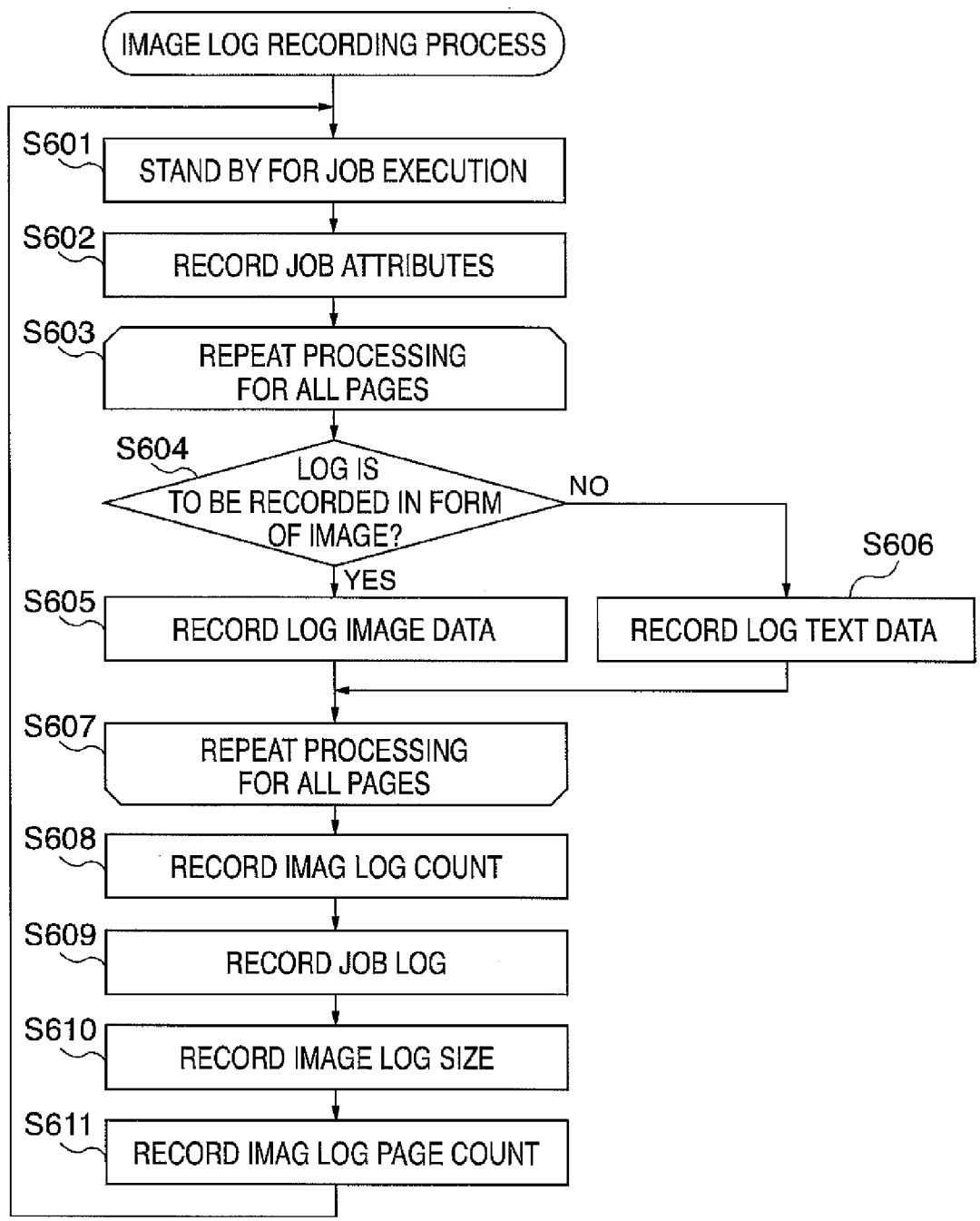
FIG. 6 is a flowchart of an image log recording process executed by a log recording agent operating on the digital multi-function machine or the print server appearing in FIG. 1.

FIG. 6 is a flowchart of the image log recording process executed by the log recording agent operating on the digital multi-function machine 101 or the print server 102 appearing in FIG. 1.

Referring to FIG. 6, first, in a step S601, the log recording agent is kept on standby until a job execution instruction is issued. In a step S602, the log recording agent receives the job execution instruction and records job attributes which are required to be set before the start of the job, including a user who gave the job execution instruction, date and time, the kind of the job, and the number of copies and that of sheets to be used for the job, and further a transmission destination in a case where the job is a transmission job. Steps S603 to S607 are repeatedly carried out the number of times corresponding to the page count of the job.

In the step S604, an image log recording form of the present job is acquired. If the log is to be recorded in the form of an image, the process proceeds to the step S605, whereas if the log is to be recorded in the form of text, the process proceeds to the step S606. In the step S605, log image data of the present page of the job is recorded, and then the process proceeds to the step S607.

In the step S606, log text data of the present page of the job is recorded. When the job is a print job, character strings are extracted from a PDL command. When the job is not a print job, OCR processing is performed on the image data to thereby extract character strings. Alternatively, first, the log image data may be recorded, and then OCR processing may be performed asynchronously to thereby extract character strings as log text data.

In a step S608, the present job is executed. In a step S609, a job log finally determined after the job execution, including the results of the job execution and the like information, is recorded. In a step S610, the capacity of recording areas used in the steps S602, S605, S606, and S609 is added to the used capacity of the day. In a step S611, the log recording agent updates the count of pages of image logs recorded therein.

Figure 7:
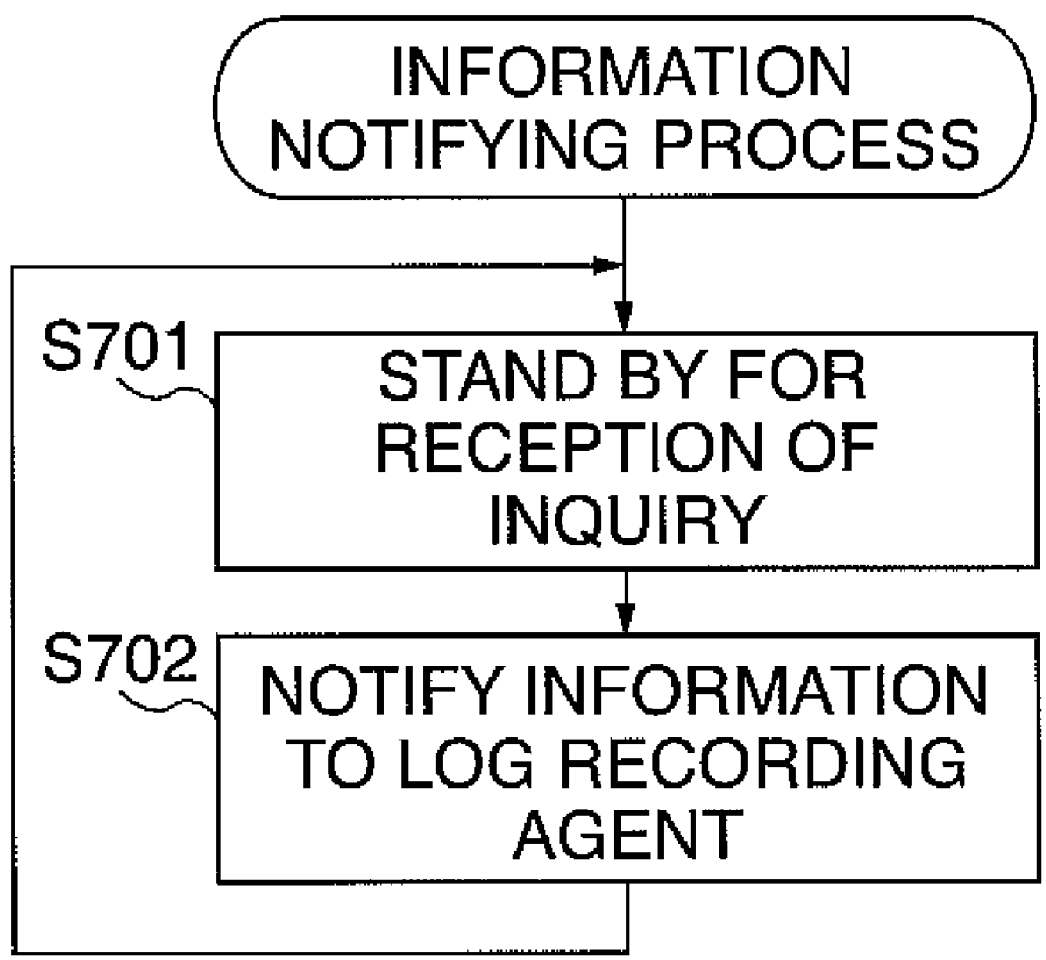
FIG. 7 is a flowchart of an information notifying process executed by the log recording agent for notifying information to the management server.

FIG. 7 is a flowchart of the information notifying process executed by the log recording agent operating on the digital multi-function machine 101 or the print server 102 appearing in FIG. 1, for notifying information to the management server.

Referring to FIG. 7, in a step S701, the log recording agent is kept on standby until an information acquisition instruction is issued from the management server 106. In a step S702, the log recording agent notifies the management server 106 of the total capacity of the recording area in the log recording agent, the used capacity of the same, the average capacity of recording area used per day over the recent ten days, and the count of pages of image logs recorded in the log recording agent.

Figure 8:
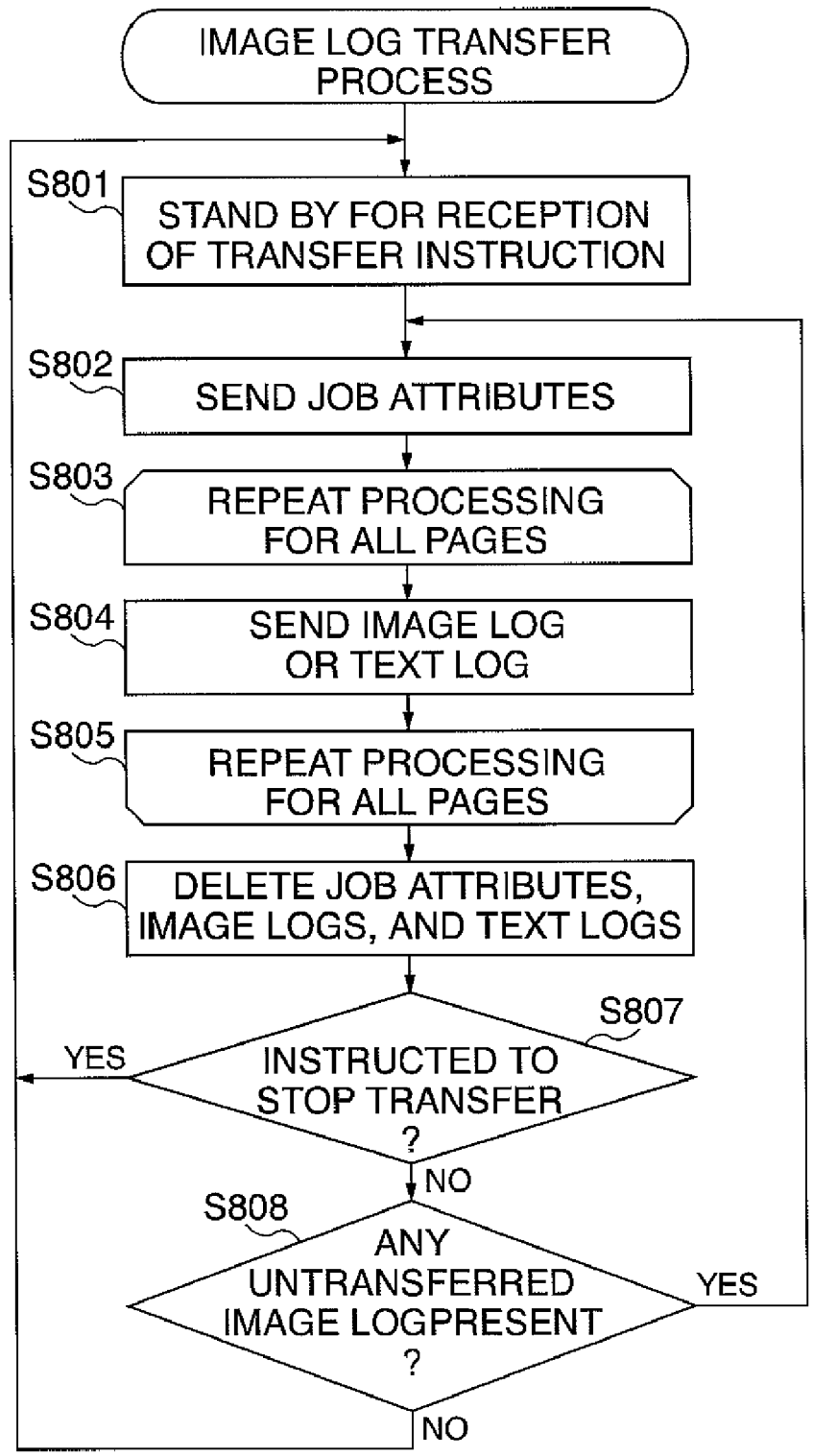
FIG. 8 is a flowchart of an image log transfer process executed by the log recording agent for transferring image logs to the management server.

FIG. 8 is a flowchart of the image log transfer process executed by the log recording agent operating on the digital multi-function machine 101 or the print server 102 appearing in FIG. 1, for transferring an image log to the management server.

Referring to FIG. 8, in a step S801, the log recording agent is kept on standby until a transfer instruction is issued from the management server 106. In a step S802, the log recording agent receives the transfer instruction and transfers job attributes. Steps S803 to S805 are repeatedly carried out the number of times corresponding to the number of pages of the job.

In a step S804, an image log or a text log of the present page is transferred. In a step S806, the job attributes, the image logs, and the text logs transferred in the steps S802 to S805 are deleted.

In a step S807, it is determined whether or not a transfer stop instruction has been received from the management server 106. If the transfer stop instruction has been received, the process returns to the step S801, whereas if not, the process proceeds to a step S808. In the step S808, it is determined whether or not any untransferred image log is present. If there is an image log left untransferred, the process returns to the step S802, whereas if not, the process returns to the step S801.

In the present embodiment, the image processing server 104 carries out, in parallel, a process for receiving an image log from a log recording agent, a process for performing image processing, a process for registering the image log in the database, and a process for transmitting information in response to an information acquisition instruction from the management server 106. The basic flows of the respective processes will be described with reference to FIGS. 9 to 12.

Figure 9:
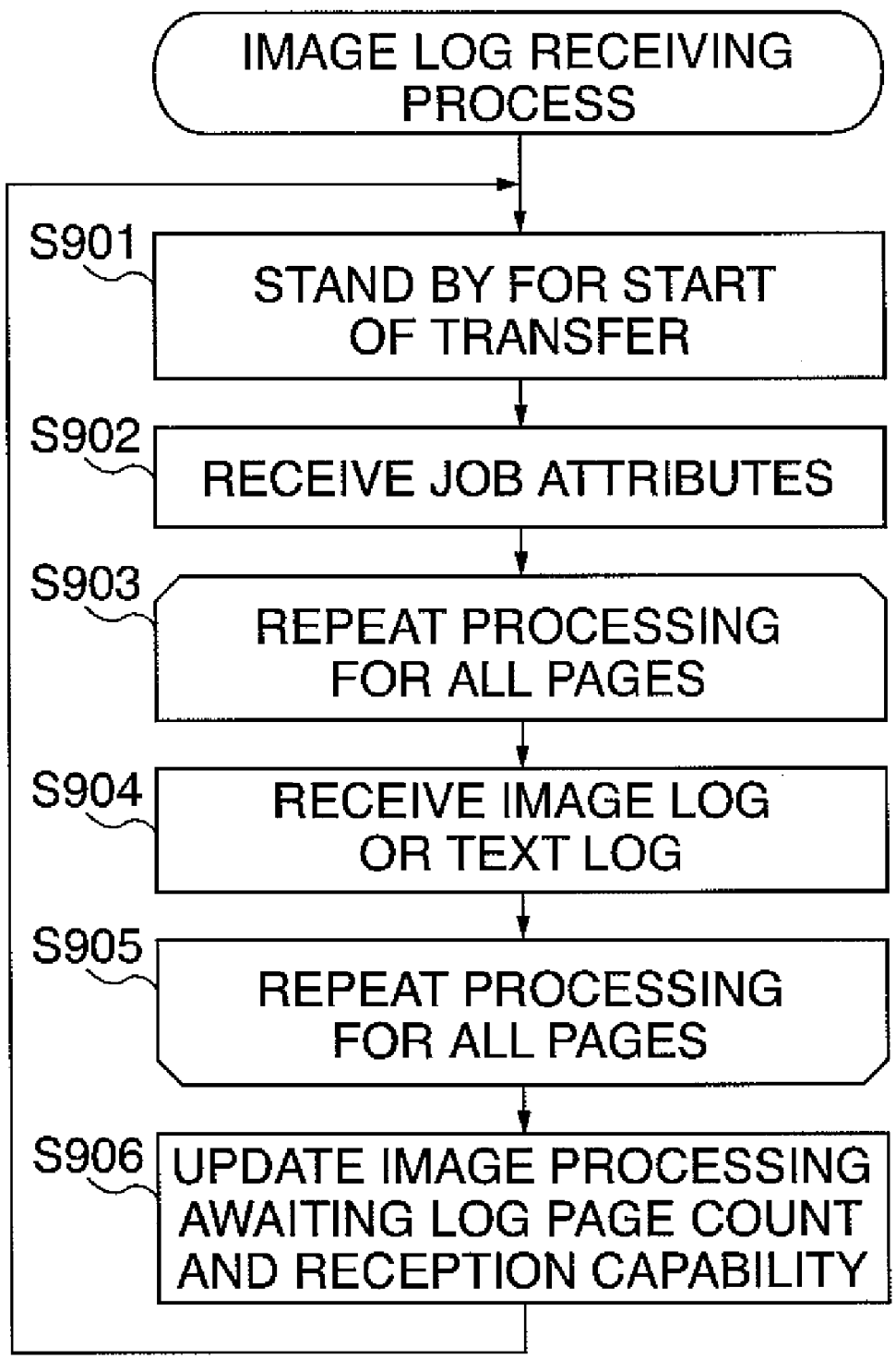
FIG. 9 is a flowchart of an image log receiving process executed by the image processing server for receiving image logs from a log recording agent.

FIG. 9 is a flowchart of the image log receiving process executed by the image processing server appearing in FIG. 1, for receiving an image log from a log recording agent.

Referring to FIG. 9, first in a step S901, the image processing server 104 is kept on standby until an image log is transferred from the log recording agent. In a step S902, the image processing server 104 accepts image log transfer from the log recording agent and receives job attributes. Steps S903 to S905 are repeatedly carried out the number of times corresponding to the number of pages of the job.

In a step S904, an image log or a text log of an associated page is received. In a step S906, the count of log pages awaiting image processing and the reception capability are updated, and then the process returns to the step S901.

Figure 10:
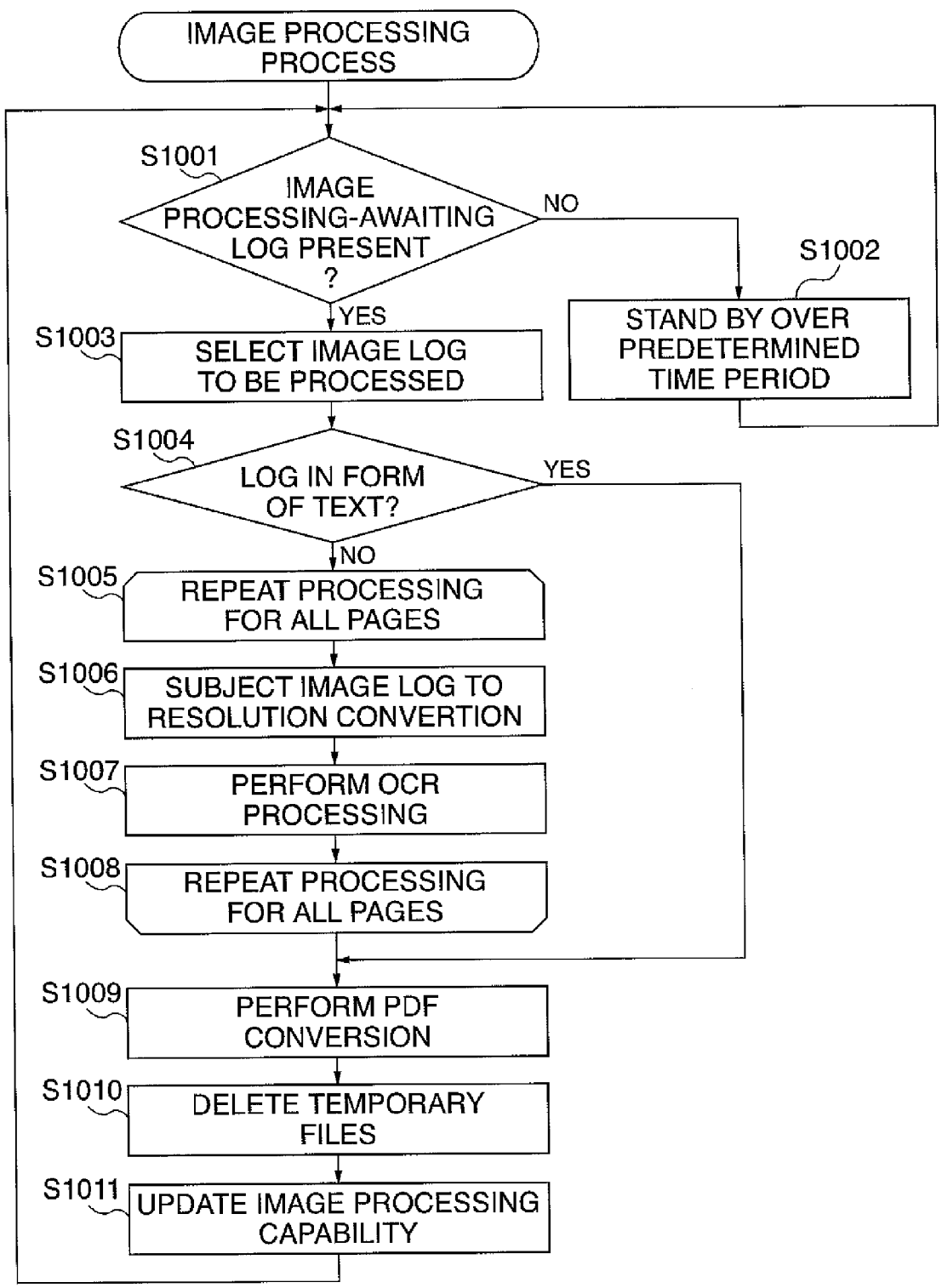
FIG. 10 is a flowchart of an image processing process executed by the image processing server.

FIG. 10 is a flowchart of the image processing process executed by the image processing server appearing in FIG. 1.

Referring to FIG. 10, first in a step S1001, it is checked whether or not a log awaiting image processing is present. If there is a log awaiting image processing, the process proceeds to a step S1003, whereas if not, the process proceeds to a step S81002.

In the step S1002, the image processing server 104 is kept on standby over a predetermined time period. Thereafter, the process returns to the step S1001. In the step S1003, a log to be processed is selected from the logs recorded in the image processing server 104 and awaiting image processing. Normally, logs are selected in order of transfer i.e. arrival, but the selection may be performed according to the priorities of log recording agents that have transferred image logs, the recording forms of the image logs, or the image log sizes.

In a step S1004, the recording form of the log is checked. When the log is in the form of text, OCR processing is not required, and therefore the process proceeds to a step S1009. Steps S1005 to S1008 are repeatedly carried out the number of times corresponding to the number of pages of the job.

In the step S1006, the image log is converted into a resolution suitable for OCR processing. Pre-OCR processing, such as binarization and skew correction of an image, may be performed in this step. In the step S1007, OCR processing is performed so as to extract text from the image.

In the step S1009, the image log is converted into a format suitable for storage in the database 105. Although in the present embodiment, the pages of the present job are batch-converted into PDF, they may be converted into a format other than PDF. Further, resolution conversion may be performed to change the resolution of an image into a smaller value so as to suppress an increase in the used capacity of the recording area of the database 105.

In a step S1010, temporary files generated for OCR processing and PDF conversion and files unnecessary for registration in the database are deleted. In the present embodiment, the files unnecessary for database registration include the image log before PDF conversion. In a step S1011, the image processing capability of the image processing server is updated.

Figure 11:
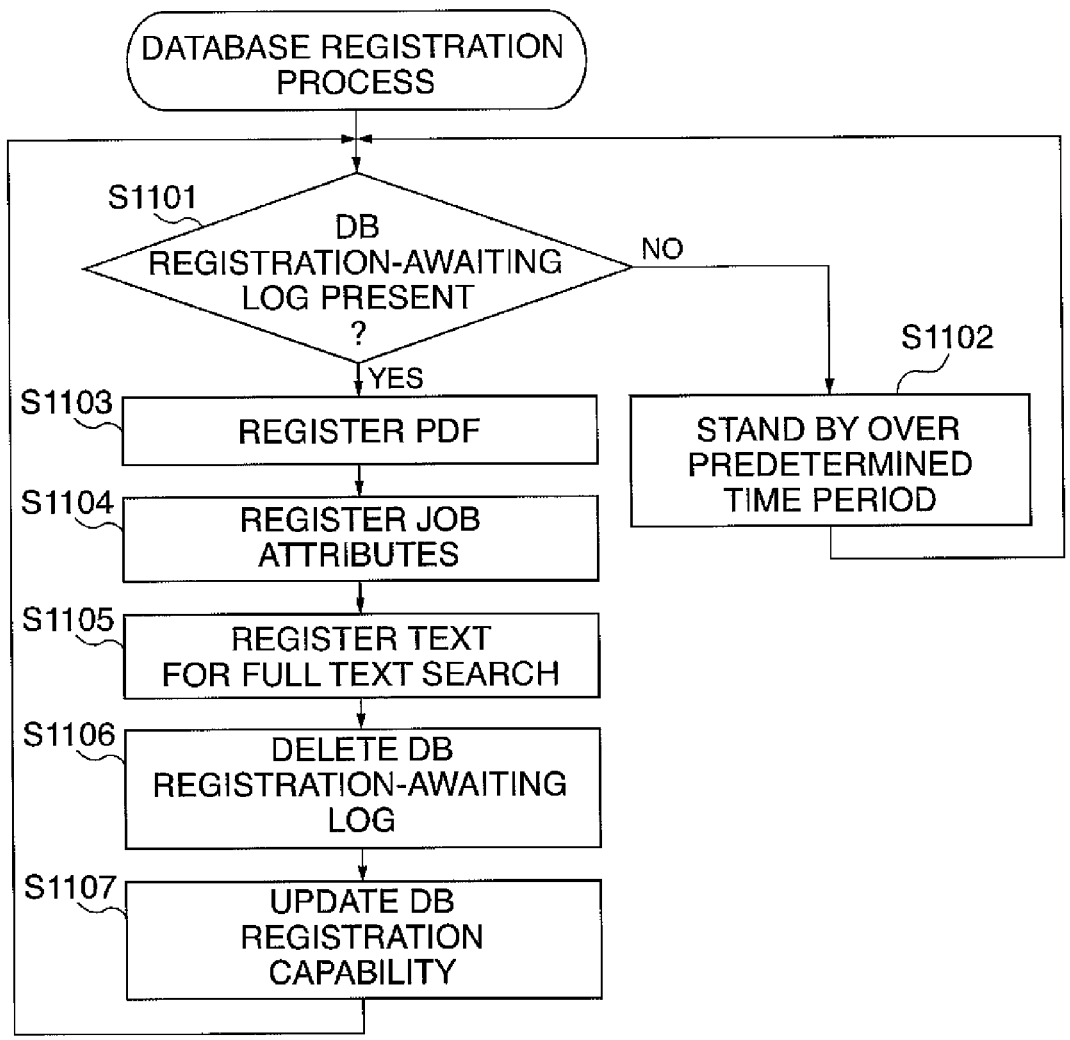
FIG. 11 is a flowchart of a database registration process executed by the image processing server.

FIG. 11 is a flowchart of the database registration process executed by the image processing server appearing in FIG. 1.

Referring to FIG. 11, first, in a step S1101, it is checked whether or not a log awaiting database registration is present. If there is a log awaiting database registration, the process proceeds to a step S1103, whereas if not, the process proceeds to a step S81102.

In the step S1102, the image processing server 104 is kept on standby over a predetermined time period. Thereafter, the process returns to the step S1101.

In the step S1103, a log to be processed is selected from the logs recorded in the image processing server 104 and awaiting database registration. Normally, logs are selected in order of generation. Then, The PDF of the selected log is registered in the database 105. In a step S1104, the job attributes of the selected log are registered in association with the registered PDF.

In a step S1105, the text log of the selected log is registered as text for full text search in association with the registered PDF. In a step S1106, the selected log is deleted. In a step S1107, the DB registration capability of the image processing server is updated.

Figure 12:
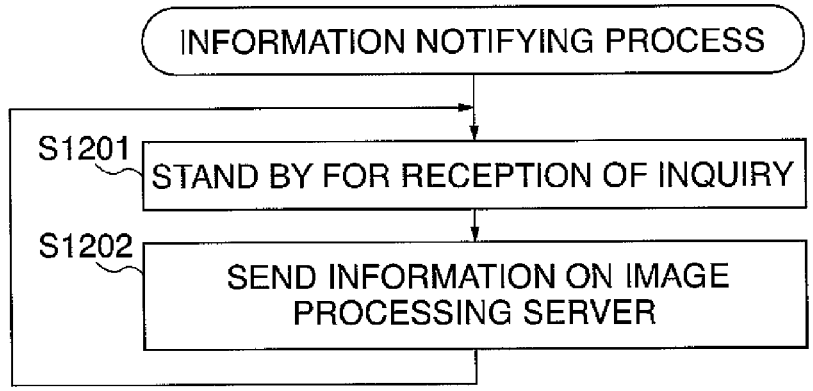
FIG. 12 is a flowchart of an information notifying process executed by the image processing server for notifying information to the management server.

FIG. 12 is a flowchart of the information notifying process executed by the image processing server appearing in FIG. 1 for notifying information to the management server.

Referring to FIG. 12, first, in a step S1201, the image processing server 104 is kept on standby until an information acquisition request is issued from the management server 106. In a step S1202, the image processing server 104 notifies information on image logs recorded therein and awaiting image processing to the management server 106.

The above-mentioned information includes the number of pages of the image logs awaiting image processing, the number of pages of image logs awaiting registration in the database, the per-page file size of the image logs awaiting image processing, and the per-page file size of image logs awaiting registration in the database.

Further, the information includes the number of image log pages that can be received per hour, the number of image log pages that can be processed per hour, the number of image log pages that can be registered in the database per hour, the total capacity of the image log recording area, and the used capacity of the same.

In the above-described embodiment, the image log recording system is configured to continuously operate without inhibiting job execution even when jobs temporarily and considerably exceeding a normal level are executed in some digital multi-function machines 101 or print servers 102. For this reason, log recording agents operating on the digital multi-function machines 101 or the print servers 102 are given priority in image log transfer.

Further, even in a case where more jobs than were expected when the size of the present image log recording system was determined are executed and put a heavy load on the system, the administrator is notified of the state by e-mail before the system fails.

Although in the above-described embodiment, the management server 106 controls transfer processing of all the log recording agents, each of the log recording agents may control its own schedule transfer and agent near-full transfer. In this case, the steps S511 to S513 in FIG. 5 are executed by each log recording agent.

In the above-described embodiment, when the recording area of the image processing server 104 is running short, the management server 106 instructs a specific log recording agent, in the step S510 in FIG. 5, to perform log transfer. Instead, the image processing server 104 may be instructed to permit reception from the specific log recording agent.

It is to be understood that the present invention may also be realized by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2006-332406 filed Dec. 8, 2006, which is hereby incorporated by reference herein in its entirety.

What is claimed is:

1. An image log recording system comprising:
an image recording unit configured to generate an image log;
an image processing server configured to perform image processing on image logs transferred from said image recording unit;
a database configured to cumulatively store the image logs subjected to image processing by said image processing server; and
a transfer management server,
wherein said image recording unit comprises:
a transfer settings-receiving unit configured to receive from said transfer management server, transfer settings for transferring the image log to said image processing server;
an image log transfer unit configured to transfer the image log to said image processing server according to the transfer settings;
a per-unit time recording amount-recording unit configured to record a per-unit time recording amount;
a per-unit time recording amount-notifying unit configured to notify said transfer management server of the recorded per-unit time recording amount; and
a recordable amount-notifying unit configured to notify said transfer management server of a currently recordable amount,
wherein said transfer management server comprises:
a transfer settings-notifying unit configured to notify said image recording unit of the transfer settings;
a load monitoring unit configured to monitor load on the image log recording system;
a transfer settings-changing unit configured to change the transfer settings based on the system load monitored by said load monitoring unit; and
a recording amount-recording unit configured to receive and record the per-unit time recording amount and the recordable amount transmitted from said image recording unit,
wherein said transfer settings-changing unit determines the transfer settings for transferring the image log from said image recording unit, based on the per-unit time recording amount and the recordable amount of said image recording unit.

2. The image log recording system as claimed in claim 1, wherein said load monitoring unit monitors at least one of a reception capability, a storage capability, an image processing capability, a database registration capability, a reception amount, a storage amount, an image processing amount, or a database registration amount of said image processing server.

3. The image log recording system as claimed in claim 1, wherein said transfer settings-changing unit determines the transfer settings further based on at least one of a priority, a transfer capability, and a recording form of said image recording unit, which are set or measured in advance.

4. The image log recording system as claimed in claim 1, wherein said transfer management server further comprises a high load notification unit configured to be operable when a high load is detected by said load monitoring unit, to notify the high load to an administrator.

5. The image log recording system as claimed in claim 1, wherein said image recording unit is implemented by any of a digital multi-function machine, a printer, a print server, or a computer that generates print jobs.

6. The image log recording system as claimed in claim 1, wherein two or more of said image processing server, said database, and said transfer management server are formed by an identical server.

7. The image log recording system as claimed in claim 1, wherein said recordable amount-notifying unit notifies said transfer management server of a recordable amount with respect to a predetermined capacity.

8. The image log recording system as claimed in claim 1, further comprising:
a recording amount change-recording unit configured to record a change in a recording amount measured over a predetermined time period,
wherein said per-unit time recording amount-notifying unit notifies the recorded per-unit time recording amount based on the change in the recording amount.

9. The image log recording system as claimed in claim 8, further comprising a recording amount change input unit configured to accept input of an estimated recording amount change from a user.

10. An image log recording system, comprising:
an image recording unit configured to generate an image log;
an image processing server configured to perform image processing on image logs transferred from said image recording unit;
a database configured to cumulatively store the image logs subjected to image processing by said image processing server; and
a transfer management server,
wherein said image recording unit comprises:
an image log transfer unit configured to transfer the image log to said image processing server;
wherein said transfer management server comprises:
a transfer permission settings-notifying unit configured to notify said image processing server of a transfer permission setting;
a load monitoring unit configured to monitor load on the image log recording system;
a transfer settings-changing unit configured to change the transfer permission setting based on the system load monitored by said load monitoring unit, and
wherein said image processing server comprises:
a transfer permission setting-receiving unit configured to receive the transfer permission setting from said transfer management server; and
an image log reception-permitting unit configured to determine, based on the received transfer permission setting, whether or not to enable the transfer of the image log from said image recording unit, and permit reception of the image log only when the transfer of the image log is determined to be enabled.

11. A control method for an image log recording system including an image recording unit configured to generate an image log, an image processing server configured to perform image processing on image logs transferred from the image recording unit, a database configured to cumulatively store the image logs subjected to image processing by the image processing server, and a transfer management server, the method comprising:

a transfer settings-receiving step of receiving from the transfer management server, transfer settings for transferring the image log to the image processing server;

an image log transfer step of transferring an image log to the image processing server according to the transfer settings;

a per-unit time recording amount-recording step of recording a per-unit time recording amount;

a per-unit time recording amount-notifying step of notifying the transfer management server of the recorded per-unit time recording amount;

a recordable amount-notifying step of notifying the transfer management server of a currently recordable amount, wherein the image recording unit executes said transfer settings-receiving step, said image log transfer step, said per-unit time recording amount-recording step, said per-unit time recording amount-notifying step, and said recordable amount-notifying step;

a transfer settings-notifying step of notifying the image recording unit of the transfer settings;

a load monitoring step of monitoring load on the image log recording system;

a transfer settings-changing step of changing the transfer settings based on the system load monitored in said load monitoring step, a recording amount-recording step of receiving and recording the per-unit time recording amount and the recordable amount from the image recording unit, wherein said transfer settings-changing step determines the transfer settings for transferring the image log from the image recording unit, based on the per-unit time recording amount and the recordable amount of the image recording unit, and wherein the transfer management server executes said transfer settings-notifying step, said load monitoring step, and said transfer settings-changing step, and said recording amount-recording step.

12. A non-transitory computer-readable storage medium storing a control program executable by computers to perform a control method for an image log recording system including an image recording unit configured to generate an image log, an image processing server configured to perform image processing on image logs transferred from the image recording unit, a database configured to cumulatively store the image logs subjected to image processing by the image processing server, and a transfer management server, the control program comprising:

a transfer settings-receiving module for causing the image recording unit to receive from the transfer management server, transfer settings for transferring the image log to the image processing server;

an image log transfer module for causing the image recording unit to transfer the image log to the image processing server according to the transfer settings;

a per-unit time recording amount-recording module for causing the image recording unit to record a per-unit time recording amount;

a per-unit time recording amount-notifying module for causing the image recording unit to notify the transfer management server of the recorded per-unit time recording amount;

a recordable amount-notifying module for causing the image recording unit to notify the transfer management server of a currently recordable amount, a transfer settings notification module for causing the transfer management server to notify the image recording unit of the transfer settings;

a load monitoring module for causing the transfer management server to monitor load on the image log recording system;

a transfer settings-changing module for causing the transfer management server to change the transfer settings based on the system load monitored by said load monitoring module; and a recording amount-recording module for causing the transfer management server to receive and record the per-unit time recording amount and the recordable amount transmitted from the image recording unit, wherein said transfer settings-changing module determines the transfer settings for transferring the image log from the image recording unit, based on the per-unit time recording amount and the recordable amount of the image recording unit.

* * * * *